United States Patent
Godfrey et al.

(10) Patent No.: US 9,267,189 B2
(45) Date of Patent: Feb. 23, 2016

(54) METHODS FOR FORMING DISPERSION-STRENGTHENED ALUMINUM ALLOYS

(71) Applicant: HONEYWELL INTERNATIONAL INC., Morristown, NJ (US)

(72) Inventors: Donald G. Godfrey, Phoenix, AZ (US); Richard Bye, Morristown, NJ (US); Mark C. Morris, Phoenix, AZ (US); Harry Kington, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 504 days.

(21) Appl. No.: 13/801,662

(22) Filed: Mar. 13, 2013

(65) Prior Publication Data
US 2014/0271322 A1    Sep. 18, 2014

(51) Int. Cl.
*B22F 3/105*    (2006.01)
*C22C 1/04*    (2006.01)

(52) U.S. Cl.
CPC .............. *C22C 1/0416* (2013.01); *B22F 3/1055* (2013.01); *B22F 2202/11* (2013.01); *B22F 2301/052* (2013.01)

(58) Field of Classification Search
CPC ........... B22F 2201/11; B22F 2301/052; B22F 3/1055; C22C 1/0416
USPC ................................................ 419/25, 53, 55
See application file for complete search history.

(56) References Cited

U.S. PATENT DOCUMENTS

| 4,729,790 | A | * | 3/1988 | Skinner | C22C 1/0416 419/38 |
| 4,828,632 | A | * | 5/1989 | Adam | C22C 1/0416 148/437 |
| 4,878,967 | A | * | 11/1989 | Adam | C22C 1/0416 148/437 |
| 5,279,642 | A | * | 1/1994 | Ohtera | C22C 1/0416 148/403 |
| 8,506,836 | B2 | * | 8/2013 | Szuromi | B22F 3/1055 216/102 |
| 8,691,333 | B2 | * | 4/2014 | Godfrey | B22F 3/1055 427/180 |
| 9,073,264 | B2 | * | 7/2015 | Abe | B22F 3/1055 |
| 9,120,151 | B2 | * | 9/2015 | Godfrey | B22F 3/1266 |

(Continued)

FOREIGN PATENT DOCUMENTS

| DE | 102007018123 A1 | * | 10/2008 |
| EP | 0221276 A1 | | 5/1987 |
| WO | 0145882 A3 | | 6/2001 |
| WO | 2008125092 A1 | | 10/2008 |

OTHER PUBLICATIONS

English translation of DE 102007018123; Oct. 2008; 17 pages.*

(Continued)

*Primary Examiner* — Helene Klemanski
(74) *Attorney, Agent, or Firm* — Ingrassia Fisher & Lorenz, P.C.

(57) ABSTRACT

In accordance with an exemplary embodiment, a method of forming a dispersion-strengthened aluminum alloy metal includes the steps of providing a dispersion-strengthened aluminum alloy composition in a powdered form, directing a low energy density laser beam at a portion of the powdered alloy composition, and withdrawing the laser beam from the portion of the powdered alloy composition. Subsequent to withdrawal of the laser beam, the portion of the powdered alloy composition cools at a rate greater than or equal to about $10^{6\circ}$ C. per second, thereby forming the dispersion-strengthened aluminum alloy metal.

17 Claims, 6 Drawing Sheets

(56) References Cited

U.S. PATENT DOCUMENTS

| | | | |
|---|---|---|---|
| 2003/0010409 A1* | 1/2003 | Kunze | B22F 3/1055 148/513 |
| 2006/0192322 A1* | 8/2006 | Abe | B22F 3/1055 264/497 |
| 2007/0084839 A1 | 4/2007 | Zhang et al. | |
| 2009/0263266 A1 | 10/2009 | Pandey | |
| 2010/0065142 A1* | 3/2010 | McMasters | B23P 6/007 419/7 |
| 2011/0017359 A1 | 1/2011 | Pandey | |

OTHER PUBLICATIONS

Froes, F.H. et al.; Materials and Science in Sports; Production of Sports Equipment Components Via Powder Metallurgy, pp. 57-70, TMS.

EP Examination Report for Application No. 14157969.8, dated Jul. 1, 2014.

EP Search Report for Application No. 14157969.8, dated Jun. 3, 2014.

\* cited by examiner

METHODS FOR FORMING DISPERSION-STRENGTHENED ALUMINUM ALLOYS

TECHNICAL FIELD

Embodiments of the present disclosure generally relate to metal alloys for use in aerospace applications, and more particularly relate to improved methods for forming dispersion-strengthened aluminum alloys.

BACKGROUND

Aluminum base Al—Fe alloys have been developed that have mechanical properties comparable to titanium alloys up to temperatures of around 350° C. and can, because of their lower density—2.9 compared to 4.5 g/cc—result in significant weight savings in several applications. Although properties of these dispersion strengthened alloys are attractive, applications have been restricted, due to the complexity of the fabrication process required to make useful shapes. The benefits that could potentially be derived through use of such alloys have heretofore been offset by the cost of fabricating the alloys into useful shapes.

Figure 1:
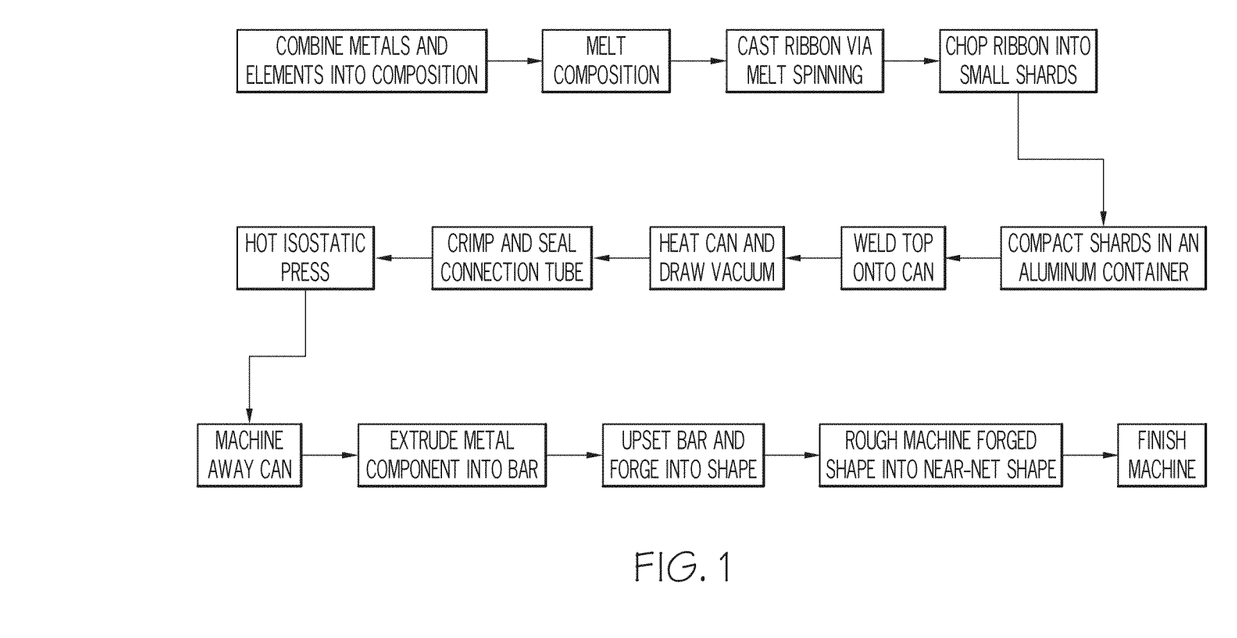
FIG. 1 is a flow diagram illustrating the steps in a prior art process for forming components with dispersion-strengthened aluminum alloys.

It is difficult and expensive to manufacture components with these advanced aluminum base Al—Fe alloys because a multi-step process is required that includes rapid solidification ribbon casting, ribbon pulverizing, powder canning, HIP, extrusion, and forging to generate and maintain the unique microstructure and material properties of the alloy. FIG. 1 illustrates this process. The need for extensive hot working by extrusion and forging also limits the size and complexity of parts that can be practicably produced from the alloy.

Accordingly, it is desirable to provide improved methods for forming dispersion strengthened aluminum alloys. Further, it is desirable to provide such methods that do not require ribbon casting. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method of forming a dispersion-strengthened aluminum alloy metal includes the steps of providing a dispersion-strengthened aluminum alloy composition in a powdered form, directing a low energy density laser beam at a portion of the powdered alloy composition, and withdrawing the laser beam from the portion of the powdered alloy composition. Subsequent to withdrawal of the laser beam, the portion of the powdered alloy composition cools at a rate greater than or equal to about $10^{6°}$ C. per second, thereby forming the dispersion-strengthened aluminum alloy metal.

In accordance with another exemplary embodiment, a method of forming a dispersion-strengthened aluminum alloy component includes the steps of providing a dispersion-strengthened aluminum alloy composition in a powdered form, providing a three-dimensional design for the component, and subjecting the powdered alloy composition to an additive manufacturing procedure that employs a low energy density laser beam. The additive manufacturing procedure is performed in accordance with the three-dimensional design.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the aluminum alloys and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved methods for forming dispersion-strengthened aluminum alloy components for use in aerospace applications, more particularly for use as gas turbine engine components, it will be appreciated that the methods described herein will be useful in any number of applications wherein components formed of such alloys would be useful. In particular, the methods described herein may find application in any of various implementations where it is desirable to employ light-weight alloys for high-temperature applications of up to about 350° C.

Disclosed herein is an improved method for forming dispersion-strengthened aluminum alloy components using a free-form manufacturing process. Embodiments of the present disclosure utilize a manufacturing process that incorporates a low energy density laser beam, referred to as "direct metal laser fusion" (DMLF), or a low energy electron beam, referred to as "electron beam melting" (EBM), in a powder tank. These "free-form" or "additive manufacturing" (AM) processes use a small, focused beam to build a component by fusing or melting one layer of powder to the fused or melted layer of powder directly beneath it. The additive manufacturing methods disclosed herein utilize DMLF/EBM to build unique designs that are not practical and/or possible with prior technologies such as ribbon casting, where costly and time-consuming tooling and processes are required.

In general, it is expected that, based on the teachings herein, a person having ordinary skill in the art will be able to design a component part, such as for use in a gas turbine engine, to conform for use in a wide variety of applications, as the selection of size, shape, etc. of working components is generally considered to be within the level of skill of a person having ordinary skill in the art. As such, the various possible implementations and uses of the improved methods described herein should not be considered limited to any of the embodiments presented herein.

Embodiments of the present disclosure provide an enabling technology that allows dispersion strengthened aluminum alloy components to be formed without the need to use the expensive and time-consuming ribbon casting procedures previously known in the art. Greater detail regarding the additive manufacturing techniques noted above will now be provided, again with reference to the exemplary gas turbine engine components. It will be appreciated that certain features of the presently described gas turbine engine components would be prohibitively expensive to manufacture using conventional manufacturing techniques. Using additive manufacturing techniques, however, or other recently developed manufacturing techniques, component parts can be manufactured at a significantly reduced cost as compared to traditional manufacturing techniques. Additive manufacturing techniques include, for example, direct metal laser sintering (DMLS—a form of direct metal laser fusion (DMLF)). DMLS/DMLF is discussed in greater detail below. Another technique includes electron beam melting (EBM).

Alloys preferred for use in the process of the present disclosure are the rapidly solidified high-temperature aluminum alloys disclosed in U.S. Pat. No. 4,729,790, U.S. Pat. No. 4,828,632, and U.S. Pat. No. 4,878,967. Such alloys have a composition of the formula $Al_{bal}Fe_aSi_bX_c$, wherein X is at least one element selected from the group consisting of Mn, V, Cr, Mo, W, Nb, Ta; "a" ranges from 2.0 to 7.5 at % (atomic percent); "b" ranges from 0.5 to 3.0 at %; "c" ranges from 0.05 to 3.5 at %, and the balance is aluminum plus incidental impurities, with the proviso that the ratio [Fe+X]:Si is within the range from about 2.0:1 to 5.0:1.

The alloys used in this disclosure are preferably based on Al—Fe—V—Si. In one particular embodiment, the dispersoid may be a fine, nearly spherical phase with a composition approximating $Al_{12}(Fe,V)_3Si$. This silicide dispersoid may make up from 5 to 45 volume-% of the alloy, preferably from 15 to 40 volume-%. This gives a range of alloy compositions all having a [Fe+V]:Si ratio within the range 2:1 to 5:1. These Al—Fe—V—Si alloys may contain from 0.02 to 0.5 at % of a fifth element, which may be Mn, Mo, W, Cr, Ta, Zr, Ce, Er, Sc, Nd, Yb, or Y.

A particularly preferred alloy for use with the methods described here is the alloy Al-8009, which is commercially available from RSP Technology. AL-8009 is an Al—Fe—V—Si alloy that contains a uniform dispersion of stable (up to about 350° C.), nanometer scale silicides with a composition of about $Al_{12}(Fe,V)_3Si$ in an aluminum solid solution matrix. The silicide is a metastable phase that requires cooling rates of about $10^{6}$° C./second during solidification in order to form. Until now, the prior art ribbon casting process has been the only practical means of producing solidification cooling rates high enough, that is about $10^{6}$° C./second, to form the desired microstructure in this material. This prior art process produces thin (about 0.025 mm) alloy ribbons by impinging a molten metal stream onto a rapidly spinning, water cooled wheel. In order to produce useful products, the alloy ribbons must be broken up and then consolidated and shaped using powder processing processes such as hot isostatic pressing (HIP), extrusion, and forging.

The present disclosure provides methods for forming the dispersion-strengthened aluminum alloys using additive manufacturing processes, for example DMLF. Using this novel DMLF approach, it is now possible to create a manufacturing process that can be used to produce components directly from dispersion strengthened aluminum alloys, for example alloy Al-8009, provided in powder form that, until now, could only be produced using the prior art ribbon approach. DMLF is a manufacturing process that allows for the manufacturing of components layer-by-layer. The DMLF process allows for the elimination of several expensive manufacturing processes associated with producing parts from cast ribbons. The rapid cooling of the dispersion-strengthened aluminum alloy via the DMLF process is a unique process as it provides for an innovative way to produce components with internal passages that are not possible using a forging technology. DMLF technology allows for the manufacturing of components directly from Al-8009 material built up by using a scanning laser to melt and solidify very thin (less than 0.025 mm) layers of powder. The cooling rates achieved by utilizing this technology may be as high as $10^6$ or $10^{7}$° C./second (depending upon build geometry, laser focal parameters, laser power, and laser scanning speed) thus producing the desired microstructure directly in the part without the costs and complexities of the prior art methods. As such, the steps of applying the DMLS laser to the powdered alloy, withdrawing the DMLS laser, and cooling the melt at $10^6$ or $10^{7}$° C./second (as a result of the laser being withdrawn) are performed during operation of a DMLS (or other) additive manufacturing process.

DMLF is an additive manufacturing process that is used to produce complex geometries in a single operation with no tooling. The ribbon casting processing/manufacturing route cannot produce detailed features of a geometry referred to as "near-net" as can the DMLF process. The prior art process only allows for the manufacturing of ribbons that must then be chopped up, consolidated, heated, and forged into a shape that is subsequently machined to a print geometry. This processing must be done with great care in order to minimize micro-structural changes and property degradation. DMLF technology allows for the print geometry to be produced "near-net" without the application of the heating and forging processes.

Figure 2:
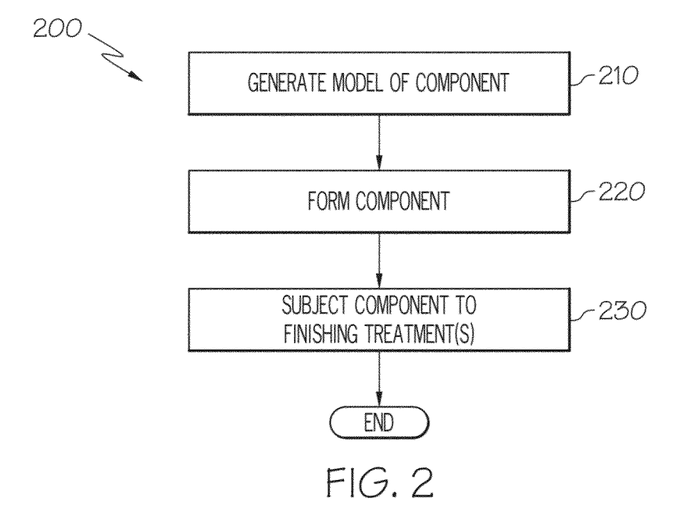
FIG. 2 is a flow diagram illustrating steps in a method of forming a dispersion-strengthened aluminum alloy component in accordance with the present disclosure.

FIG. 2 is a flowchart illustrating a method 200 for manufacturing a component, for example an aerospace component, using a dispersion-strengthened aluminum alloy in accordance with an exemplary embodiment using, in whole or in part, additive manufacturing techniques. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the dispersion-strengthened aluminum alloy using DMLF. Accordingly, the present disclosure should not be considered as limited by any particular component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the component in step 220. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the component. However, prior to a discussion of the subsequent method steps, reference is made to FIG. 3, which is a schematic view of a DMLF system 300 for manufacturing the component, for example one or more gas turbine engine components, in accordance with an exemplary embodiment.

Figure 3:
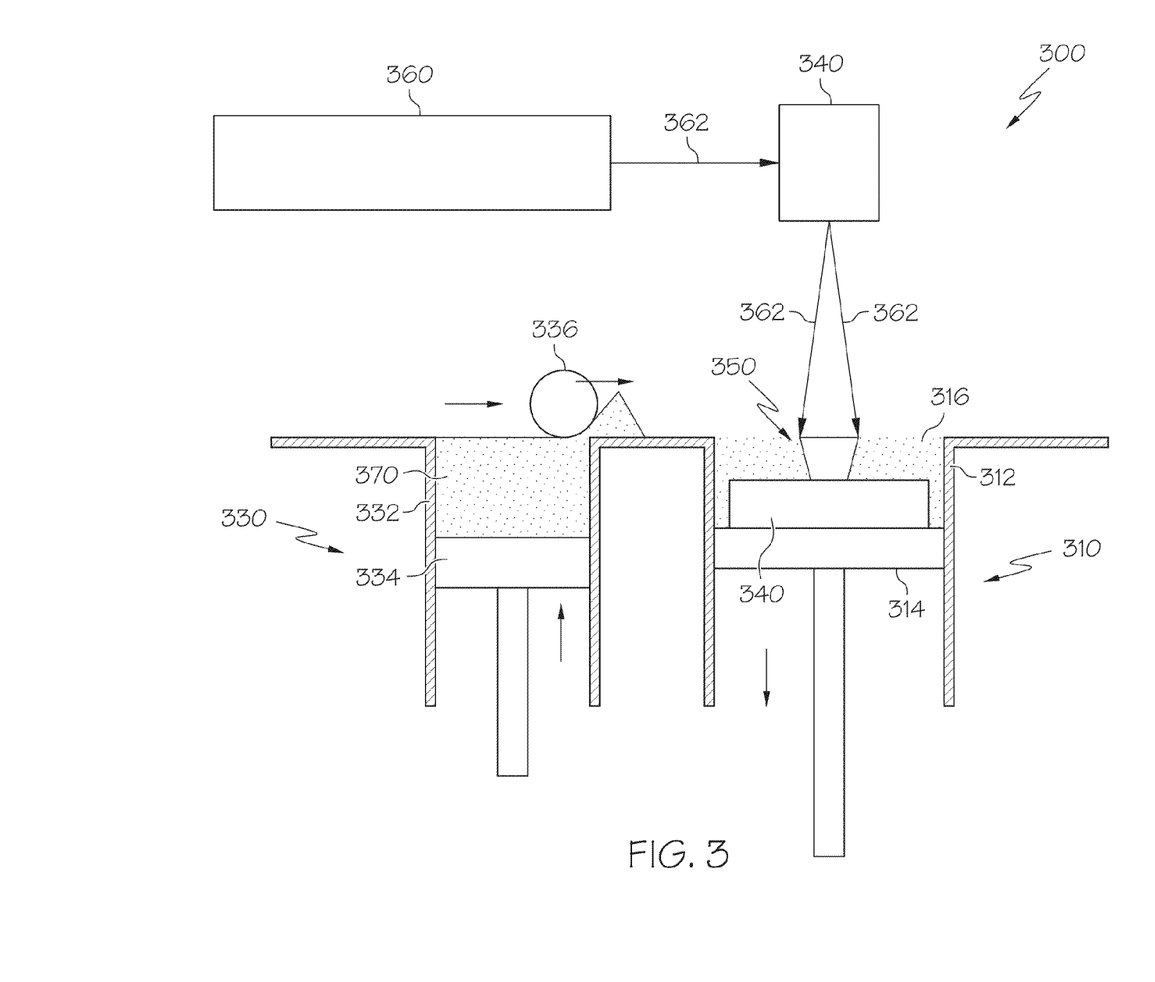
FIG. 3 is an exemplary additive manufacturing system suitable for use in forming a dispersion-strengthened aluminum alloy component in accordance with the present disclosure.

Referring to FIG. 3, the system 300 includes a fabrication device 310, a powder delivery device 330, a scanner 340, and a laser 360 that function to manufacture the article 350 (e.g., the component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 is provided as an aluminum alloy in powdered form with a composition that is capable of achieving a dispersion strengthened microstructure after appropriate processing. For example, the build material is one having the formula: $Al_{bal}Fe_aSi_bX_c$, wherein X is at least one element selected from the group consisting of Mn, V, Cr, Mo, W, Nb, Ta; "a" ranges from 2.0 to 7.5 at %; "b" ranges from 0.5 to 3.0 at %; "c" ranges from 0.05 to 3.5 at %, and the balance is aluminum plus incidental impurities, with the proviso that the ratio [Fe+X]:Si is within the range from about 2.0:1 to 5.0:1. The alloys used in this disclosure are preferably based on Al—Fe—V—Si. In one particular embodiment, the dispersoid may be a fine, nearly spherical phase with the composition of about $Al_{12}(Fe,V)_3Si$ phase. A particularly preferred alloy for use with the methods described here is the alloy Al-8009. In general, the powder build material 370 may be selected for enhanced strength, durability, and useful life, particularly at high temperatures, although as described below, the powder build material 370 may also be selected based on the intended function of the area being formed. The powdered form of the alloy is produced by combining the various constituents (metals and other elements) of the alloy into a mixture, melting the mixture, and atomizing the melted mixture to form a powder, a process which is well-known in the art.

Returning to FIG. 2, at the completion of step 220, the article, i.e., the component, may be given a stress relief treatment and then is removed from the additive manufacturing system (e.g., from the DMLF system 300). In optional step 230, the component formed in step 220 may undergo finishing treatments. Finishing treatments may include, for example, polishing and/or the application of coatings. If necessary, the component may be machined to final specifications. For example, in some embodiments in accordance with the present disclosure, aerospace components can be manufactured by the DMLF process (optionally including machining) described herein.

ILLUSTRATIVE EXAMPLE

The present disclosure is now illustrated by the following non-limiting example. It should be noted that various changes and modifications can be applied to the following example and processes without departing from the scope of this invention, which is defined in the appended claims. Therefore, it should be noted that the following example should be interpreted as illustrative only and not limiting in any sense.

Figure 4:
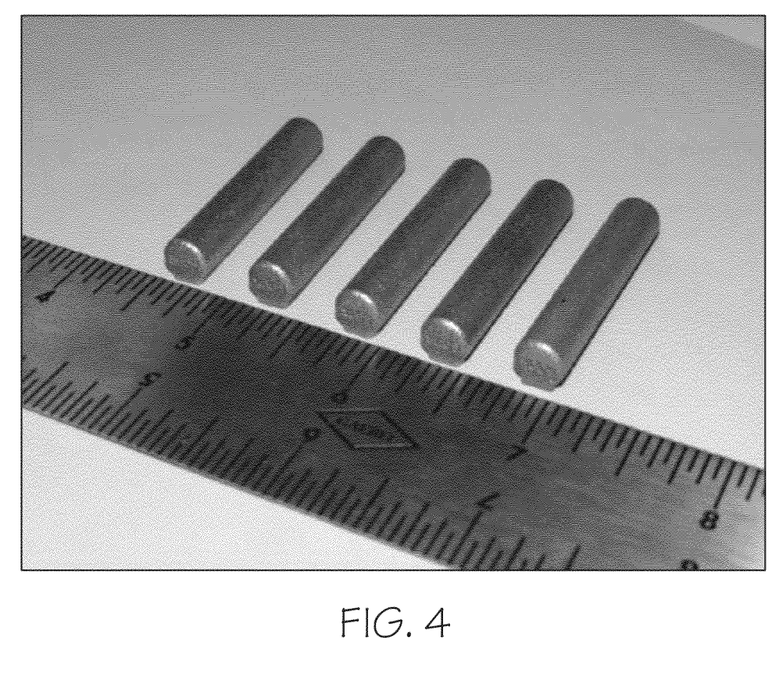
FIG. 4 is an image of several component "blanks" produced in accordance with an embodiment of the present disclosure, shown both in perspective and cross-section.

32 cylindrical sample blanks were produced from an atomized Al-8009 powder using a commercially-obtained DMLS system according to the procedures described above in FIGS. 2 and 3. The produced blanks were approximately 0.3" in diameter by 1.56" long. FIG. 4 is an image of several of the produced blanks.

Figure 5:
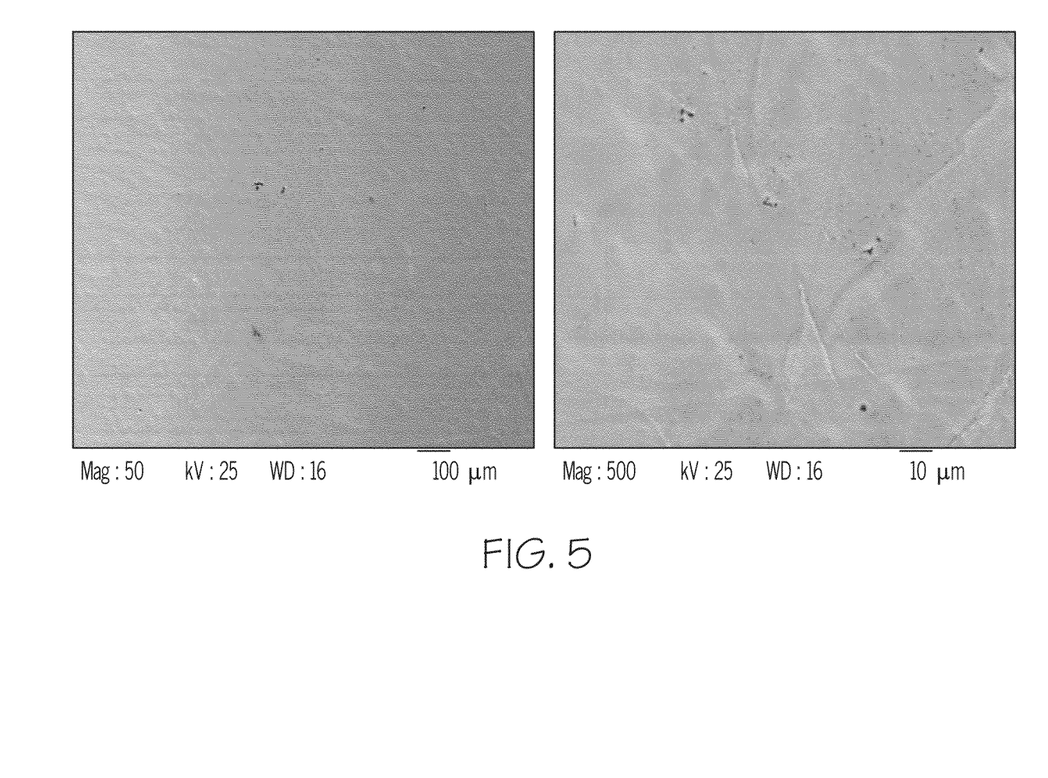
FIG. 5 contains scanning electron microscope (SEM) images of one of the blanks shown in FIG. 4.

Optical and SEM metallography, X-ray diffraction (XRD), and microhardness were used to characterize samples produced. XRD indicated that the desired $Al_{12}(Fe,V)_3Si$ silicides were formed in the blanks, with no other equilibrium precipitates being formed. FIG. 5 contains scanning electron microscope (SEM) images of one of the blanks, showing no large, equilibrium precipitates being formed.

Figure 6:
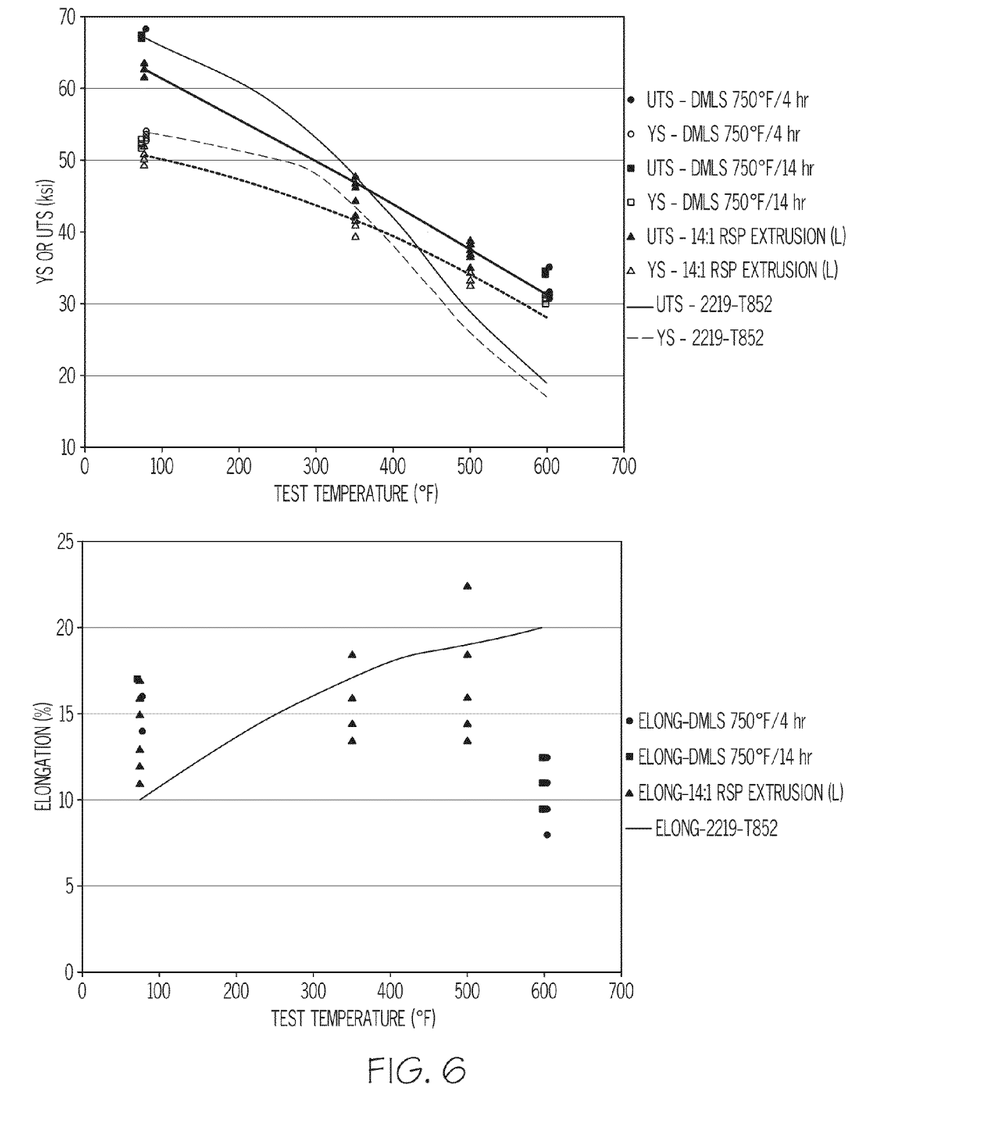
FIG. 6 is a graph showing the tensile and elongation strengths of a sample component produced in accordance with the present disclosure.

The as-built specimens were tested at room temperature and at 600° F., with the latter test being conducted on specimens that were exposed to a temperature of 750° F. for 4 or 14 hours. Tensile strengths at both room temperature and 600° F. were equal to or better than those of conventionally produced Al-8009 extrusions. Elongations were roughly equivalent to those of longitudinally oriented specimens from extrusions. FIG. 6 is a graph showing the tensile and elongation strengths of the tested components along with those of conventionally processed Al-8009 and of alloy 2219, which is an aluminum alloy with improved elevated temperature properties compared to other conventional aluminum alloys. There was a drop in strength after the first 4 hours of exposure to 750° F., which was chosen to represent a possible stress relief cycle for DMLS components, but, as shown in FIG. 6, tensile properties were essentially unaffected by an additional 10 hour exposure to 750° F.

Accordingly, the exemplary embodiments described herein provide improved methods for forming dispersion-strengthened aluminum alloy components. Using the additive manufacturing processes described herein, such as the DMLF process, the desired alloy microstructure and properties can be generated directly in a component, without the need for the multiple steps required to turn cast ribbon into useful components. The described embodiments allow for the elimination of the consolidation, extrusion, and forging steps minimizes their potentially damaging effects on microstructure and properties, thus producing parts with properties equal to or exceeding those of components produced via the conventional powder processing route. The DMLF process does not need expensive and unique extrusion and forging tooling and equipment associated with the prior art manufacturing methods.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method of forming a dispersion-strengthened aluminum alloy metal comprising the steps of:
    providing, in a powdered form, an aluminum alloy composition that is capable of achieving a dispersion-strengthened microstructure, wherein providing the aluminum alloy composition comprises providing a composition of the following formula: $Al_{bal}Fe_aSi_bX_c$, wherein X is at least one element selected from the group consisting of Mn, V, Cr, Mo, W, Nb, and Ta; "a" ranges from 2.0 to 7.5 at %; "b" ranges from 0.5 to 3.0 at %; "c" ranges from 0.05 to 3.5 at %, and the balance is aluminum plus incidental impurities, with the proviso that the ratio [Fe+X]:Si is within the range from about 2.0:1 to 5.0:1;
    directing a low energy density laser beam at a portion of the alloy composition;
    withdrawing the laser beam from the portion of the powdered alloy composition; and
    cooling the portion of the powdered alloy composition at a rate greater than or equal to about $10^{6}$° C. per second, thereby forming the dispersion-strengthened aluminum alloy metal.

2. The method of claim 1, wherein providing the aluminum alloy composition in powdered form comprises mixing a plurality of metals and elements forming the alloy to form a mixture, melting the mixture to form a melted mixture, and atomizing the melted mixture into the powdered form.

3. The method of claim 1, wherein providing the aluminum alloy composition comprises providing a composition approximating the following formula: $Al_{12}(Fe,V)_3Si$.

4. The method of claim 1, wherein directing a low energy density laser beam at a portion of the powdered alloy composition comprises subjecting the powdered alloy composition to an additive manufacturing procedure that employs a low energy density laser beam.

5. The method of claim 4, wherein subjecting the powdered alloy composition to the additive manufacturing procedure comprises subjecting the powdered alloy composition to a direct metal laser sintering procedure.

6. The method of claim 1, wherein cooling the portion of the powdered alloy composition occurs immediately upon withdrawal of the laser beam.

7. The method of claim 6, wherein cooling the portion of the powdered alloy composition occurs as a result of the withdrawal of the laser beam.

8. The method of claim 1, further comprising directing the low energy density laser beam at a further portion of the alloy composition.

9. The method of claim 8, further comprising withdrawing the laser beam from the further portion of the powdered alloy composition.

10. The method of claim 9, further comprising cooling the further portion of the powdered alloy composition at a rate greater than or equal to about $10^{6}$° C. per second, thereby forming additional dispersion-strengthened aluminum alloy metal.

11. The method of claim 10, wherein the steps of directing the low energy density laser beam, withdrawing the laser beam, and cooling the portion of the powdered alloy composition are performed as a result of an additive manufacturing process applied to the powdered alloy composition.

12. The method of claim 11, wherein the additive manufacturing process is direct metal laser sintering.

13. A method of forming a dispersion-strengthened capable aluminum alloy component comprising the steps of:
providing an Al—Fe—V—Si aluminum alloy composition in a powdered form;
providing a three-dimensional design for the component; and
subjecting the powdered alloy composition to an additive manufacturing procedure that employs a low energy density laser beam, wherein the additive manufacturing procedure is performed in accordance with the three-dimensional design.

14. The method of claim 13, wherein providing the three-dimensional design for the component comprises providing a three-dimensional design for an aerospace component.

15. The method of claim 14, wherein providing the three-dimensional design for the aerospace component comprises providing a three-dimensional design for a gas turbine engine component.

16. A method of forming a dispersion-strengthened capable aluminum alloy component comprising the steps of:
providing an Al—Fe—V—Si aluminum alloy composition in a powdered form;
providing a three-dimensional design for the component; and
directing a low energy density laser beam at a portion of the alloy composition;
withdrawing the laser beam from the portion of the powdered alloy composition; and
cooling the portion of the powdered alloy composition at a rate greater than or equal to about $10^{6°}$ C. per second, thereby forming the dispersion-strengthened aluminum alloy metal, wherein the steps of directing, withdrawing, and cooling are performed during the application of an additive manufacturing procedure to the aluminum alloy that is performed in accordance with the three-dimensional design.

17. The method of claim 16, wherein providing the aluminum alloy composition comprises providing a composition approximating the following formula: $Al_{12}(Fe,V)_3Si$.

* * * * *